United States Patent Office 3,231,640
Patented Jan. 25, 1966

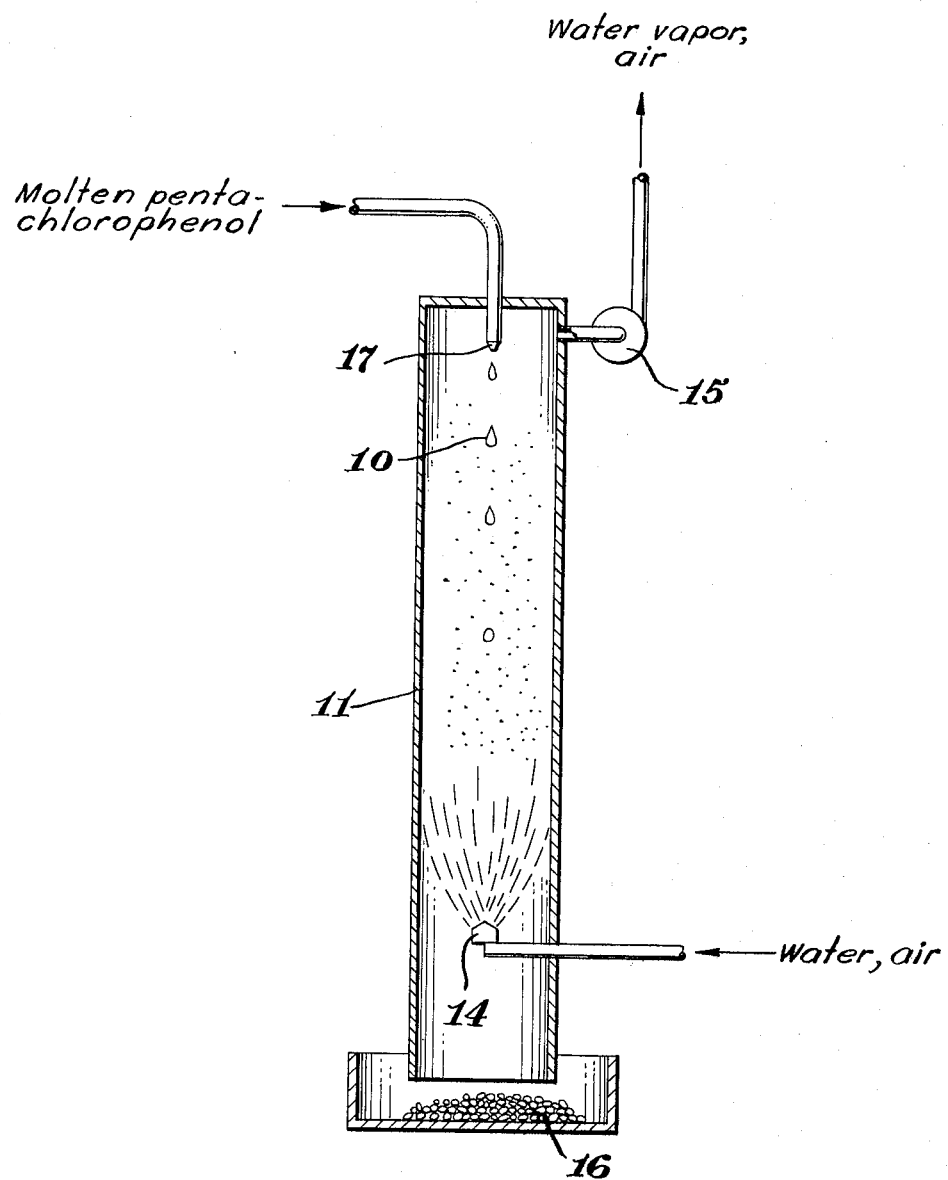

3,231,640
METHOD OF PELLETING PENTACHLOROPHENOL
Adam F. Klopf, Bay City, Mich., assignor to The Dow Chemical Company, Midland, Mich., a corporation of Michigan
Filed Oct. 3, 1962, Ser. No. 227,987
4 Claims. (Cl. 264—13)

This invention relates to a method of forming pellets. More particularly, this invention is concerned with a method wherein uniformly-sized, relatively dry pellets are formed by solidification of liquid droplets introduced to the upper portion of a vertical column containing fog.

Illustrated in the accompanying drawing is one embodiment of the present invention.

It has now been discovered that pelleting of pentachlorophenol may be accomplished by introducing molten pentachlorophenol as droplets 10 of desired pellet size to the upper portion of a vertical column 11 having dispersed therein a water fog 12.

Dispersion of water fog 12 in the column 11 may be accomplished as by an air-water nozzle or atomizer 14. Air, then, supports the fog 12 in the column 11 and provides sufficient upward force to cause water fog to flow countercurrent to the falling pentachlorophenol 10. Water vapor and air are usually removed from the top of the column. A small fan 15 may be used at the top of the column, as desired, to aid in removal of air and water vapor from the column and also to aid in controlling the upward flow of fog, air and water vapor in the column. Further control of air flow within the column may be accomplished by sealing the bottom of the column if desired.

Solid pellets 16 of pentachlorophenol are removed from the bottom of the column 11, preferably in a dry state. This may be readily accomplished by design of the column such that the pellets 16, while substantially cooled and solidified retain sufficient residual heat to evaporate any water which may adhere to the pellets.

Molten pentachlorophenol, at a temperature as close to its melting point as practical, is introduced as particles to the vertical column. Since pellets of relatively uniform size are generally desirable, means such as a nozzle 17, for introducing molten pentachlorophenol to the column as droplets of a uniform size should usually be provided.

When the method of the present invention is employed, uniformly-sized, relatively dry pellets of pentachlorophenol may be obtained with a minimum loss due to sublimation.

A better understanding of the method of this invention may be obtained in light of the following example which is set forth to illustrate, and is not to be construed to limit, the present invention.

*Example I*

Molten pentachlorophenol at a temperature of about 200° centigrade was gravity fed to a nozzle having a 0.024 inch opening at the top of a five foot tall by four inch diameter vertical column. A bifluid (air-water) nozzle located at the center and six inches from the bottom of the column was used to direct a fog of air and water upwardly inside the column. Air and water vapor containing only a minor amount of pentachlorophenol were withdrawn near the top of the tower by means of a small fan. At the bottom of the column, uniformly-sized, relatively dry pellets were collected.

Various modifications may be made in the present invention without departing from the spirit or scope thereof, and it is to be understood that I limit myself only as defined in the appended claims.

I claim:
1. A method of pelleting pentachlorophenol which comprises introducing molten particulate pentachlorophenol into the upper portion of a vertical column, introducing into said column, at a point below the pentachlorophenol inlet, a fog of liquid water, providing means whereby said water fog is caused to move upward in said column, and allowing said particulate pentachlorophenol to fall downwardly through said column, thereby contacting said pentachlorophenol with said water fog, and removing pellets of pentachlorophenol from the bottom of the column.

2. A method of pelleting pentachlorophenol which comprises introducing molten particulate pentachlorophenol at a temperature close to its melting point into the upper portion of a vertical column, introducing into said column at a point below the pentachlorophenol inlet, a fog of liquid water, providing means whereby said water fog is caused to move upward in said column, and allowing said particulate pentachlorophenol to fall downwardly through said column, thereby contacting said pentachlorophenol with said water fog, and removing pellets of pentachlorophenol from the bottom of the column.

3. A method of pelleting pentachlorophenol which comprises introducing molten particulate pentachlorophenol in particles of substantially uniform size into the upper portion of a vertical column, introducing into said column, at a point below the pentachlorophenol inlet, a fog of liquid water, providing means whereby said water fog is caused to move upwardly in said column, and allowing said particulate pentachlorophenol to fall downwardly through said column, thereby contacting said pentachlorophenol with said water fog, and removing substantially uniformly sized pellets of pentachlorophenol from the bottom of the column.

4. A method of pelleting pentachlorophenol which comprises introducing molten particulate pentachlorophenol at a temperature of about 200 degrees centigrade into the upper portion of a vertical column, introducing into said column at a point below the pentachlorophenol inlet, a fog of liquid water, providing means whereby said water fog is caused to move upward in said column, and allowing said particulate pentachlorophenol to fall downwardly through said column, thereby contacting said pentachlorophenol with said water fog, and removing substantially dry pellets of pentachlorophenol from the bottom of the column.

References Cited by the Examiner

UNITED STATES PATENTS

| | | | |
|---|---|---|---|
| 2,563,815 | 8/1951 | Bruce | 260—623 |
| 2,811,748 | 11/1957 | Smith | 18—47.2 |
| 2,921,335 | 1/1960 | Bowers et al. | 18—2.7 |
| 3,051,761 | 8/1962 | MacBeth et al. | 260—623 |

ALEXANDER H. BRODMERKEL, *Primary Examiner.*

MORRIS LIEBMAN, *Examiner.*